Sept. 7, 1954 R. ANNEN 2,688,521
OIL-SEALED SHAFT BEARING
Filed Aug. 6, 1951

Inventor
Robert Annen
by Karl Michaelis, atty.

Patented Sept. 7, 1954

2,688,521

UNITED STATES PATENT OFFICE 2,688,521

OIL-SEALED SHAFT BEARING

Robert Annen, Bienne, Switzerland, assignor to Roulements à Billes Miniatures S. A., Bienne, Switzerland, a joint-stock company Application August 6, 1951, Serial No. 240,504

Claims priority, application Switzerland August 11, 1950

9 Claims. (Cl. 308—187.2)

This invention relates to shaft bearings and more especially antifriction bearings.

It is an object of this invention to provide bearings of this kind, in which a cap or cover closing as a separate member the part of the bearing traversed by the shaft is spaced or separated from this part of the bearing by a capillary gap capable of maintaining between the bearing and the shaft a thin oil film serving to close the gap between the shaft and the bearing.

Bearings of the kind aforesaid have already been disclosed in prior patents. The bearing according to the present invention distinguishes over the prior art bearings of a similar kind by the fact that the capillary gap constitutes the narrowest section of an annular space having a cross-section which gradually increases in size towards the outside, so as to provide for the oil in the gap the possibility of moving away from the capillary gap whenever the pressure in the interior of the bearing rises relative to the outer pressure, the oil being however free to return into the gap in proportion as the inner and outer pressures approach each other again.

Such rises of pressure in the interior relative to the pressure on the outside of the bearing arise quite particularly in the case where the bearing forms part of a motor or other apparatus operating in an airplane, for in that case the outside pressure is the atmospheric pressure which drops at higher altitudes, while the inner pressure cannot drop owing to the fact that bearings of this kind are as a rule enclosed in a closed space from which no air can escape. Therefore the inner pressure practically remains at least equal to the atmospheric pressure near the ground where the bearing has been mounted in place, rising however more or less during operation in view of rises of temperature, for instance due to friction, which causes the air in the inner bearing space to expand.

It is also important to note that the bearing according to the preesnt invention is distinguished from bearings resembling it at first sight by the fact that the oil film forming a sort of packing is able not only to move away from the capillary gap during such rises of the pressure in the interior relative to the pressure on the outside, but will also be returned towards and into the gap in the proportion as the values of the inner and the outer pressures again approach each other, an occurrence which does not take place in the bearings hitherto known.

In the drawings affixed to this specification and forming part thereof, some embodiments of a bearing according to the present invention are illustrated diagrammatically by way of example.

In the drawings

Figures 1, 2:
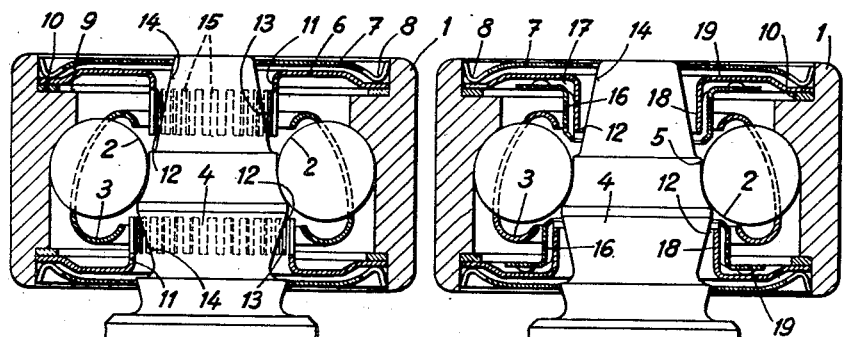
Figs. 1, 2 and 3 are cross-sections of a first, second and third embodiment, respectively, all of them having the form of ball bearings.

Referring to the drawings and first to Fig. 1, the ball bearing here shown comprises an outer casing 1, balls 2, a ball cage 3, while 4 is part of a shaft journal in which the inner ball race 5 is formed.

A cover 6 in the form of a disc perforated in the center is retained in position by an annular disc 7 whose border section 8 is beaded and formed with radial slots, resting on the peripheral part of the disc 6 which is supported by a washer 10 resting on a shoulder 9 of the casing 1.

A similar combination of parts is provided in the same arrangement at both ends of the bearing, the caps or covers 6 form radial flanges of at least approximately cylindrical sleeves 11 which are spaced from the part of the bearing (in this case the shaft journal) which extends through them, by a capillary gap 12 containing the oil film. Both these gaps 12 constitute the narrowest section of an annular space 13, whose section rises progressively towards the outside so that the film is free to move away from the capillary gap 12 when the pressure within the bearing rises relative to the outer pressure, being however returned towards the gap in proportion as the inner and outer pressures again approach each other. When the shaft journal 4 is at rest, the return of the oil film into the gap 12 occurs under the action of the capillary force. When the shaft rotates, the return of the oil film into the capillary gap is induced not only by the capillary forces, but apart therefrom also by the combined action of the centrifugal force and the surface tension acting along the part of the shaft delimiting the annular space from the inside. In fact this part of the shaft or the bearing is constituted by a conical surface 14 whose diameter increases from the outside towards the inside of the bearing.

Means are provided for maintaining a certain quantity of oil spread along the tubular sleeves 11 forming part of the cover 6. In the case here shown these means are constituted by longitudinal slots 15 formed in the sleeves which slots also act as capillary spaces extending into close proximity of the capillary gap 12.

The degree of conicity of the conical surface 14 depends on the speed of rotation of the turning part and on the viscosity of the oil used for lubrication of the bearing and for the closing of the capillary gaps and slots 13 and 12. Experiments have shown that in the practical use of these bearings the semi-angle at the peak of the surfaces 14 should preferably fall within the range of 8° and 20°.

Figure 6:
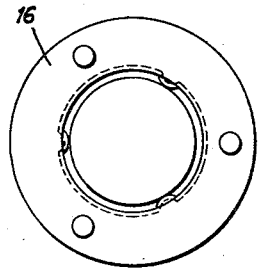
Fig. 6 is an end view of an inner cap or cover of the kind operating also in Fig. 2.

The second embodiment shown in Figs. 2 and 6 is distinguished from the first one merely by the fact that here the slots 15 are replaced by an inner cover 16 also comprising a sleeve and extending alongside of the cover 6 with very narrow spacing due to the bosses 16a which determine the width of a capillary gap 17 extending into close proximity of the capillary gap 12. The inner cover 16 thus forms together with the outer cover 6 a means allowing to maintain by capillary action a certain quantity of oil spread all along the cylindrical sleeve 18 forming part of the cover 19, analogous to the cover 6 of the first embodiment.

The other parts of the bearing as far as they are identical with similar parts of the first embodiment, are marked with the same reference numerals.

Figure 3:
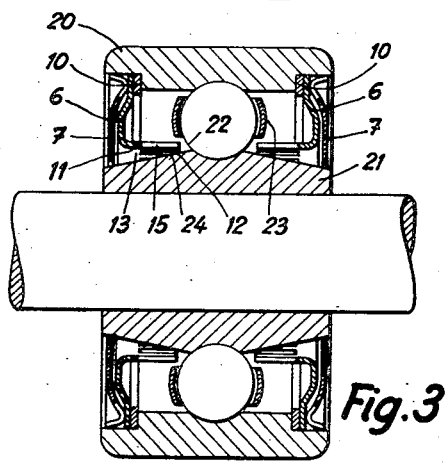

The third embodiment shown in Fig. 3 is distinguished from the first one merely by the fact that here the ball bearing comprises, apart from the outer casing 20, an inner sleeve 21, balls 22, a ball cage 23 and sealing pieces 6, 7 and 10 of the kind already described in respect of Fig. 1. The annular space 13, the narrowest section of which is constituted by the capillary gap 12, is delimited on the inside by a conical surface 24 of the inner bearing sleeve 21 which is also the part of the bearing that extends through the two covers 6.

Figure 4:
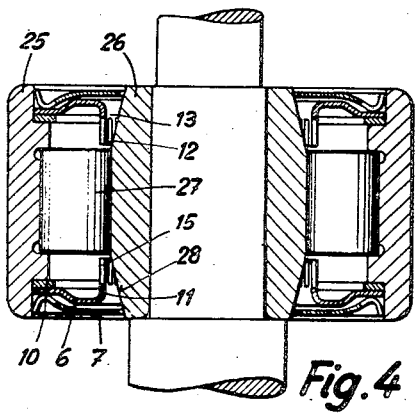
Figs. 4 and 5 are similar views of a fourth and fifth embodiment, respectively, the former being a roller bearing, while the latter supports a cylindrical shaft.

The embodiment of Fig. 4 is distinguished from the one shown in Fig. 3 only by the fact that it is a roller bearing comprising an outer casing 25, an inner sleeve 26, rollers 27 and the same sealing parts 6, 7 and 10 as were described with reference to Figs. 1 and 3. This embodiment also shows the capillary slots 15 and the capillary gaps 12 which constitute the narrowest sections of the annular spaces 13 delimited on the inside by the conical surfaces 28, corresponding to the conical surface 24 of the third embodiment, and to the conical surfaces 14 of the first and second embodiments.

Figure 5:
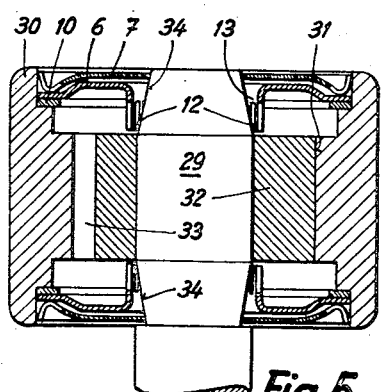

The embodiment of Fig. 5 is a cylindrical bearing for a cylindrical shaft journal 29. It comprises an outer casing 30 formed with a boring 31 which is filled by a bearing brass preferably of antifriction metal. This embodiment further comprises the same sealing parts 6, 7 and 10 as appear in the first, third and fourth embodiments. The longitudinal grooves formed in the circumference of the brass enable the oil to escape towards the bottom after having acted as lubricant on the contacting surfaces of the brass 32 and the journal 29. This latter here constitutes the part of the bearing which is formed with conical surfaces 34 resembling the surfaces 14 in the first embodiment and delimiting on their inner parts the annular spaces 13.

It is clear that one might change the embodiments according to Figs. 3, 4 and 5 in the same manner as the embodiment of Fig. 1 was changed by that shown in Fig. 2. In other words, one might replace the slotted cover 6 by a cover 19 combined with an inner cover 16. Apart therefrom it should also be noted that the capillary gaps constituted either by the slots 15 or by the spaces enclosed between the two covers 16 and 19 need not be of uniform width throughout. They might for instance narrow down slightly, starting from the capillary gap 12, in order to provide by capillary action some suction effect on the oil. On the other hand they might also narrow down slightly near the capillary gap in order to direct the oil by capillary action towards this gap.

The faces 14, 24, 28 and 34 need not be conical, but should always form a face inclined from the outside towards the inside at an angle preferably ranging between 8° and 20°.

All the bearings shown in the drawings as well as the modified forms of the bearings mentioned above can operate in any desired position in space. In the position represented in Figs. 1, 2, 4 and 5, the lower cover constitutes an oil reservoir from which the oil is led by capillary action towards the neighboring gap 12 which it fills once the bearing has been turned around, for instance on being wrapped. From this place the oil will return to the surfaces to be lubricated when the bearing is in operation without it being necessary to make any preparations. This has been ascertained convincingly by tests made under greatly varying conditions.

Obviously the invention is not limited to bearings entirely traversed by a shaft, but will be equally useful in connection with bearings closed on one side. In this case the cover 6 or 19 is replaced on that side by a centrally closed cover which may be rigid or elastic. In the latter case this cover will constitute an elastic membrane which will give way to a certain extent to differences between the outer and the inner pressure.

I wish it to be understood that I do not desire to be limited to the details shown and described for obvious modifications will occur to a person skilled in the art.

I claim:

1. An oil-sealed shaft-bearing, more especially for air craft devices, comprising in combination, an outer casing, a rotary shaft member extending therethrough, antifriction means inserted between the outer casing and said shaft member, a substantially cylindrical sleeve surrounding said shaft member and spaced therefrom to form a capillary gap therewith to hermetically seal the bearing, said sleeve enclosing with said shaft member an outwardly opening angle ranging between 8 and 20°.

2. An oil-sealed shaft bearing comprising in combination, an outer casing open at both ends, a rotary shaft member extending through said casing, antifriction means inserted between the outer casing and said shaft member, a separate substantially cylindrical sleeve surrounding said shaft member and spaced therefrom on each side of said antifriction means to form capillary gaps therewith to hermetically seal the bearing, said sleeves enclosing with said shaft member outwardly opening opposite angles ranging between 8° and 20°.

3. An oil-sealed shaft-bearing comprising in combination, an outer casing, a rotary shaft member extending into said casing, antifriction means inserted between the casing and said shaft member, a substantially cylindrical sleeve surrounding said shaft member and spaced therefrom to form a capillary gap therewith to hermetically seal the bearing, said sleeve enclosing with said shaft member an outwardly opening angle ranging between 8° and 20°, and another sleeve fixedly nested in the first-mentioned sleeve and spaced therefrom to form a capillary space leading to the capillary gap.

4. Oil-sealed shaft-bearing, comprising in combination, a bearing box, a shaft and a bearing element on said shaft extending into said box, antifriction elements in said box inserted between the box walls and said bearing element, a substantially cylindrical sleeve surrounding said bearing element in spaced relation, means seated in said box for centering said sleeve in said box, a body of oil in said box and axially extending slits in the wall of said sleeve up to the free end of said sleeve, said sleeve enclosing with said bearing element an angle, opening towards said shaft, ranging between 8° and 20°.

5. The oil-sealed shaft bearing of claim 1, in which that part of the shaft which extends through the cylindrical sleeve surrounding it, is formed with an outwardly diminishing diameter so as to create in said sleeve an oil chamber widening toward the outside.

6. The oil-sealed shaft bearing of claim 1, in which the shaft member surrounded by the cylindrical sleeve is provided with an outwardly diminishing diameter forming an angle with a cylindrical sleeve ranging between 8° and 20°.

7. The oil-sealed shaft bearing of claim 1, in which the bearing element extending through the cylinder sleeve is a sleeve closely fitting the shaft and formed with conical end sections.

8. The oil-sealed shaft bearing of claim 1, in which the inner race for the antifriction bearings is formed in a conical frustum of outwardly diminishing diameter.

9. An oil-sealed shaft bearing of claim 3 in which the shaft member surrounded by the cylindrical sleeve is provided with an outwardly diminishing diameter forming an angle with the cylindrical sleeve ranging between 8° and 20°.

References Cited in the file of this patent

UNITED STATES PATENTS

| Number | Name | Date |
|---|---|---|
| 1,895,288 | Larsh | Jan. 24, 1933 |
| 1,930,586 | Delaval-Crow | Oct. 17, 1933 |
| 1,958,907 | Brouwer | May 15, 1934 |
| 2,000,276 | Delaval-Crow | May 7, 1935 |
| 2,054,582 | Delaval-Crow | Sept. 15, 1936 |